Sept. 28, 1926. 1,601,237
W. H. CARMAN
PISTON PACKING
Filed July 5, 1924 2 Sheets-Sheet 1

Inventor
William H. Carman,
By
Attorneys

Sept. 28, 1926.                         1,601,237
W. H. CARMAN
PISTON PACKING
Filed July 5, 1924         2 Sheets-Sheet 2

Inventor
William H. Carman
By
Attorneys

Patented Sept. 28, 1926.

1,601,237

UNITED STATES PATENT OFFICE.

WILLIAM H. CARMAN, OF DETROIT, MICHIGAN.

PISTON PACKING.

Application filed July 5, 1924. Serial No. 724,338.

This invention relates to pistons and has special reference to the packing or sealing of pistons relative to cylinder walls, for instance, the reciprocable pistons of pump or engine cylinders.

My invention, in its broadest aspect, involves novel means in connection with the piston for adjusting a split piston ring in the wall of the piston so that the ring will be sealed at its split ends, prevented from circumferentially shifting relative to the piston, and during all strokes of the piston insure a better packing particlarly on the return stroke.

My invention is particularly characterized by a piston compression cap loosely articulated with the inner end of the piston positioned to produce pressure on a piston ring during compression and power strokes of the piston, so that the piston ring may have a double sealing action.

My invention is further characterized by a tubular piston body having one of its ends closed by a detachable cap screwed on the tubular piston body and locked thereon by means which also serves to seal the split ends of a piston ring mounted in the tubular piston body and retained in place by the piston cap.

Other features of my invention will appear as the construction is hereinafter described and then claimed, and reference will now be had to the drawing, wherein—

Figure 1:
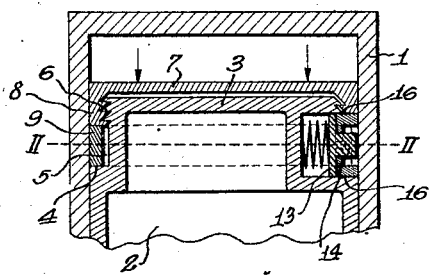
Figure 1 is a longitudinal sectional view of a portion of a cylinder and piston, the latter being in accordance with my invention.
Figure 3:
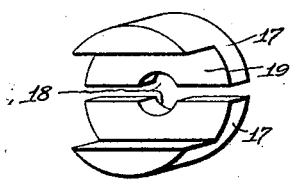
Fig. 3 is a perspective view of a detached positioning block.

Reference will first be had to Figs. 1 to 4 inclusive showing a portion of a cylinder with a portion of a piston 2 reciprocable in the cylinder and said piston has its end reduced to provide a head 3 with an annular shoulder 4 about said head, said shoulder cooperating with the head in providing two walls of a piston ring groove 5. The closed end of the head 3 is exteriorly screwthreaded, as at 6 and loosely mounted on said head is a cap 7 having an annular flange or wall 8 which is interiorly screwthreaded and adapted to be screwed on the head 3, the screw threads of said head and said cap being such that there is a lost motion or loose connection between the head and cap permitting of slight longitudinal movement of the cap relative to the head 3.

Figure 2:
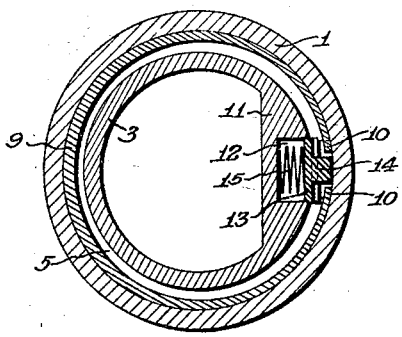
Fig. 2 is a cross sectional view taken on the line II—II of Fig. 1.
Figure 4:
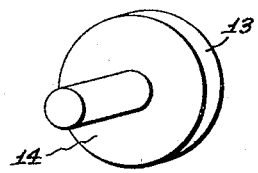
Fig. 4 is a similar view of a detached pilot member.

The edge of the cap flange or wall 8 provides the third wall of the groove 5 and in said groove is placed a conventional form of piston ring 9 having split ends 10, best shown in Fig. 2.

One side of the piston head 3 is formed with an interior enlargement 11 provided with a socket 12 and slidable in said socket is a disk-like pilot member 13 having a concentric pilot pin 14 extending between the split ends 10 of the ring 9 to prevent circumferential creeping of the piston ring in the groove 5. In the socket 12 is a coiled expansion spring 15 pressing against the pilot member 13 to hold said member normally distended.

At one side of the piston 2 the wall or shoulder 4 and the wall or flange 8 are provided with opposed segment shaped recesses 16 having walls described on arcs with radii the same as the recess or socket 12, so that the walls of the recesses 16 will be practically a continuation of the walls of the socket 12. For instance, the cap 7 may be screwed on the head 3 and then said cap and head bored to form the recesses 16 and the socket 12.

Mounted in the recesses 16 and extending into the socket 12 is a two-part positioning block or button with the parts 17 thereof substantially semi-cylindrical. The confronting edges of the block parts 17 are recessed, as at 18 to provide an opening for the pilot pin 14 and the outer faces of the block parts 17 are cut away so that said block parts may cooperate in forming a channel to receive the ends 10 of the ring 9. The channel is designated 19 and permits of one block part overlying and the other block part underlying the split ends 10 of the piston ring 9. It is now apparent that the split ends of the ring are coupled by a block which extends into the wall or flange 8 of the cap 7 and into the wall or shoulder 4 of the head 3, thus sealing the split ends of the piston ring relative to the piston. It is also obvious that after the positioning block is placed about the pilot pin 14 of the pilot member 13 that said spring pressed pilot member will force the positioning block outwardly against the wall of the cylinder 1 and being located between the head 3 and the cap 7 will serve as locking means for preventing the cap 7 from unscrewing relative to the head 3 during the operation of the piston 2 in the cylinder 1.

During compression and explosion strokes of the piston 2 and the cylinder 1 the cap 7, by virtue of its loose connection with the head 3, is forced towards the head and the wall or flange 8 of the cap 7 presses the piston ring 9 against the wall or shoulder 4 of the groove 5, at the same time pressing the block parts 17 into closer relation so that the ends 10 of the piston ring 9 are positively sealed at the positioning block. Pressing the piston ring 9 against the shoulder 4 seals the cap 7 relative to the piston and there can be no leakage of gas around the piston ring.

Figure 5:
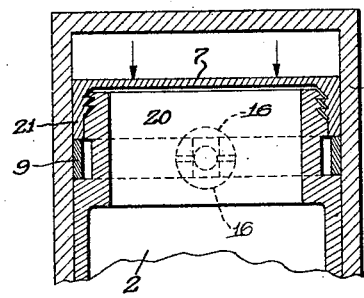
Fig. 5 is a longitudinal sectional view of a portion of a cylinder and piston illustrating a modification of my invention.

In Fig. 5 the piston 2 has a head 20 open at both ends and the cap 7 closes the open outer end of said head. The cap 7 is formed with a flange or wall 21 of greater depth than the flange or wall 8 so that the cap 7 will be positively guided by the head 20 when shifting thereon.

Figure 6:
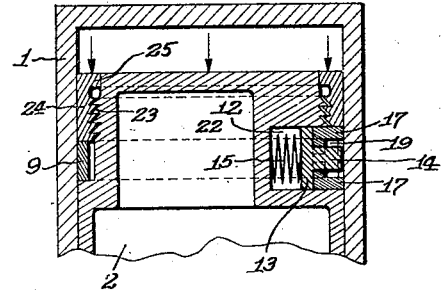
Fig. 6 is a similar view of a further modification of my invention.

In Fig. 6 a closed piston head 22 has an intermediate exterior screwthreaded portion 23 for a retaining ring 24 which is used in lieu of the cap 7, said retaining ring having a loose threaded connection and an annular guide flange 25 on the head 22. The retaining ring 24 will yield when subjected to pressure and will pack the piston ring 9 in a manner similar to the caps 7.

When the piston is not within the cylinder 1 the positioning block engaging the split ends 10 of the ring 9 maintains the parts assembled against accidental loss.

Figure 7:
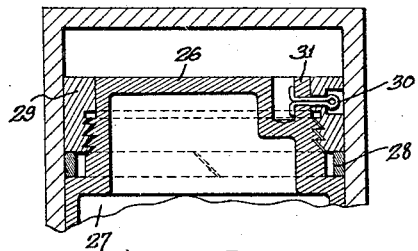
Fig. 7 is a longitudinal sectional view of a portion of the piston illustrating another modification of my invention.

Reference will now be had to a few modifications of my invention, first, that disclosed in Fig. 7. The reduced end 26 of the piston 27 is provided with a conventional form of piston ring 28 having split bias ends, devoid of any positioning or coupling member, and pressure may be brought to bear on the piston ring 28 by a retaining ring 29 loosely screwed on the reduced end 26 of the piston and loosely locked thereon by a cotter pin 30 anchored relative to a recess wall 31 of the piston. This is an instance where means loose on the reduced end of the piston may bring pressure to bear upon packing means on the piston.

Figure 8:
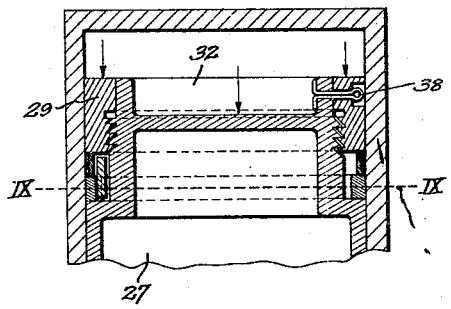
Fig. 8 is a similar view of a further modification of my invention.
Figure 9:
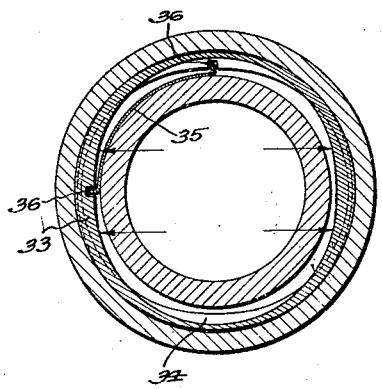
Fig. 9 is a cross sectional view taken on the line IX—IX of Fig. 8.

Practically the same retaining ring 29 is utilized in the construction shown in Figs. 8 and 9, but in this instance the outer end of the piston 27 has a chamber or recess 32 increasing the volumetric compression space between the end of the piston and the cylinder, but, in lieu of the piston ring 28, I provide special superposed piston rings 33 and 34 which may have pressure brought to bear thereon by the retaining ring 29. The rings 33 and 34 are identical in construction, each having an outer cylindrical wall and an inner elliptical wall which causes each ring to have relatively thick and thin portions, the thin portions being diametrically opposed and at a right angle to the diametrically opposed thick portions. In assembling the rings the diametrically opposed thick portions of one ring are placed at a right angle to the diametrically opposed thick portions of the adjacent ring, as brought out in Fig. 9, and to at all times maintain this relation and prevent one ring from circumferentially creeping relative to its adjacent ring, a resilient coupling member 35 is employed. This coupling member has an angular end engaging in a notch 36 in the thick wall of one ring and an angular end engaging in a similar notch in the thick wall of the other ring. The joined rings may bodily shift circumferentially of the piston, but not one independent of the other. The rings may be made in various ways so that the natural shape of each ring, outside of a piston, will be substantially elliptical or oval necessitating compression or contraction of portions of the ring towards cylindrical form in order that the ring, either off or on a piston, may be placed in a cylinder. Such a ring will have an inherent tendency to hug the walls of the cylinder in which the piston reciprocates, thus sealing the piston relative to the cylinder wall.

Figure 10:
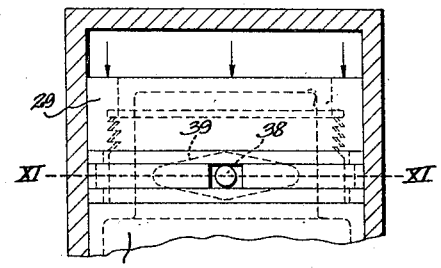
Fig. 10 is a side elevation of a portion of the piston showing a still further modification of my invention.
Figure 11:
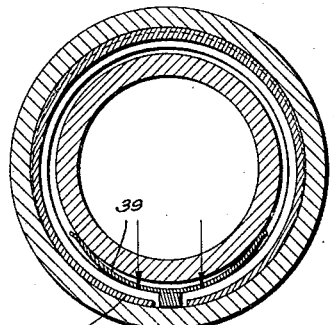
Fig. 11 is a cross sectional view taken on the line XI—XI of Fig. 10.

Reference will now be had to Figs. 10 and 11 again showing the piston 27 provided with the retaining ring 29 and this retaining ring is adapted to bring pressure to bear on one or more piston rings 37 having split ends with a pilot pin or positioning block 38 therebetween, said pilot pin or positioning block being carried by a resilient segment shaped member 39 located against the reduced end of the piston 27. The expansive force of this member will hold the pilot pin against the cylinder wall and by reason of its resiliency frictionally engage the piston and prevent circumferential creeping of the piston ring. This resilient member is used in lieu of a positioning block and pilot member and is an example of other forms of resilient members that could be used for the same purpose.

Figure 12:
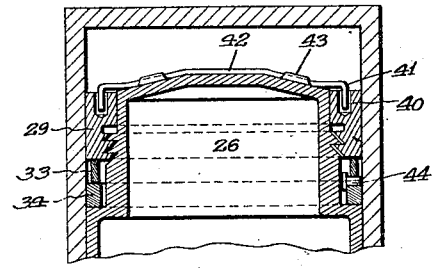
Fig. 12 is a vertical sectional view showing a locking device for a piston retaining ring.

For some types of pistons having comparatively thin walls, it may be impossible to conveniently use the cotter pin 30 or a positioning member for preventing rotation of the retaining ring 29. I may therefore provide a retaining ring with opposed recesses 40 for the angular ends 41 of a locking member 42 which may extend transversely of the piston and be spot welded or otherwise connected thereto, as at 43. The locking member 42 will prevent accidental rotation of the retaining ring 29, and when it is necessary to remove said ring, the spot welding may be ground to release the locking member 42, which may again be secured to the piston, by spot welding, after the retaining ring 29 has been adjusted. This has been shown in Fig. 12, and I also show a small positioning member 44 between the confronting edges of the piston rings 33 and 34, said piston rings being notched to receive the positioning member 44, preferably in the form of a headed pin, adapted to prevent circumferential creeping of one ring relative to the other.

Again referring to that type of piston having a positioning member, I desire to direct attention to the fact that the cap 7 constitutes means, movable on the end of the piston, for bringing pressure to bear on the edge of the piston ring 9 so that the opposite edge of the piston ring will be packed against the piston. It is in this connection that the piston ring 9 represents one or more packing rings or members about the piston and if pressure is brought to bear upon one packing member others may be crowded so as to seal the piston relative to the cylinder. Furthermore, I desire to point out that the cushioning block, being made of two parts is applicable to piston rings of different widths for the reason that the parts of the positioning block may be brought closer together or separated farther apart. Another advantage is gained in making the block of two channel parts, namely that of preventing rotation of the block when the split ends of the piston ring project into the block. It is by virtue of such split ends that the parts are held assembled when the piston is outside of the cylinder, even though it is necessary to contract the piston rings about the piston and push the block inwardly in order to place the piston in the cylinder. With the block made of two parts one part may shift relative to the other especially when the pilot pin 14 of the pilot member 13 loosely fits between said parts, and it is the adjustemnt of one block part relative to the other that permits of the cap 7 moving relative to the piston.

It is thought that the utility of my invention will be apparent without further description, and while in the drawings there are illustrated the preferred embodiments of my invention, it is to be understood that the structural elements are susceptible to such variations and modifications as fall within the scope of the appended claims.

What I claim is:—

1. In a piston, adjacent rings, each ring having opposed thick walls and opposed relative thin walls, one of said rings being positioned so that its relatively thin walls are adjacent the thick walls of the other ring.

2. In a piston, adjacent rings, each having an outer out-of-round wall with the major axis of one ring approximately parallel to the minor axis of the other ring.

3. The combination of a piston, packing means about said piston and a cap in loose screw-threaded engagement with said piston against said packing means and adapted to exert a pressure on said packing means during reciprocation of said piston.

4. A piston packing comprising rings co-operating in forming a substantially outer cylindrical wall, said rings having outer walls out-of-round with said rings arranged so that outer wall portions of one ring are offset relative to outer wall portions of the other ring.

5. The combination with a piston having a groove with the split piston ring in said groove, of a two-part positioning block at the split ends of said piston ring, and a movable cap on said piston held against rotation by said block and adapted to exert pressure on said block and said piston ring during reciprocation of said piston.

6. The combination set forth in claim 5, and a pilot member mounted in said piston and extending into said block.

7. The combination with a piston and a piston ring mounted therein, of a cap loosely screwed on said piston and during reciprocation thereof adapted to exert pressure on said piston ring to crowd it on said piston, and a yieldable block set in said piston and a portion of said cap and adapted to prevent rotation of said cap relative to said piston.

8. The combination called for in claim 7, wherein said block is composed of two parts one of which extends into said cap and the other into said piston, said block parts having a channel to receive said piston ring.

9. The combination of a piston, a movable cap on said piston, a two-part block having a part in said cap and a part in said piston, and a split ring held on said piston by said cap and having its split ends extending between the parts of said block.

10. The combination with a cylinder, of continuous uninterrupted piston rings normally out of round and adapted to be compressed to enter said cylinder, said rings having inner walls of oval configuration.

11. The combination called for in claim 10, said rings positioned with the major axes thereof at an angle relative to each other.

In testimony whereof I affix my signature.

WILLIAM H. CARMAN.